H. A. BEAN.
AUTO FORK.
APPLICATION FILED MAY 14, 1918.
1,366,156.
Patented Jan. 18, 1921.
8 SHEETS—SHEET 4.
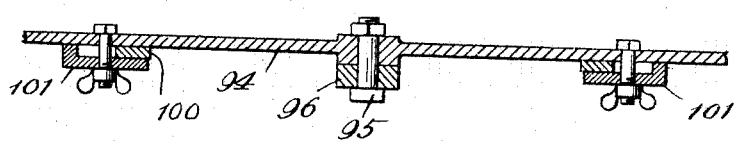
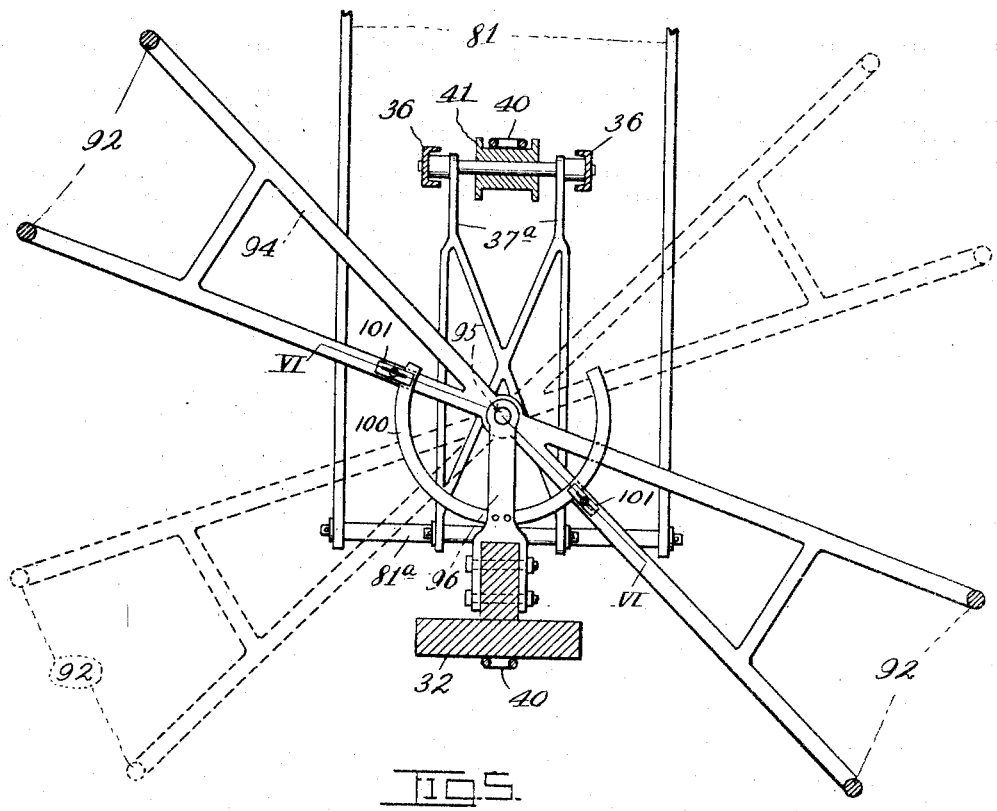

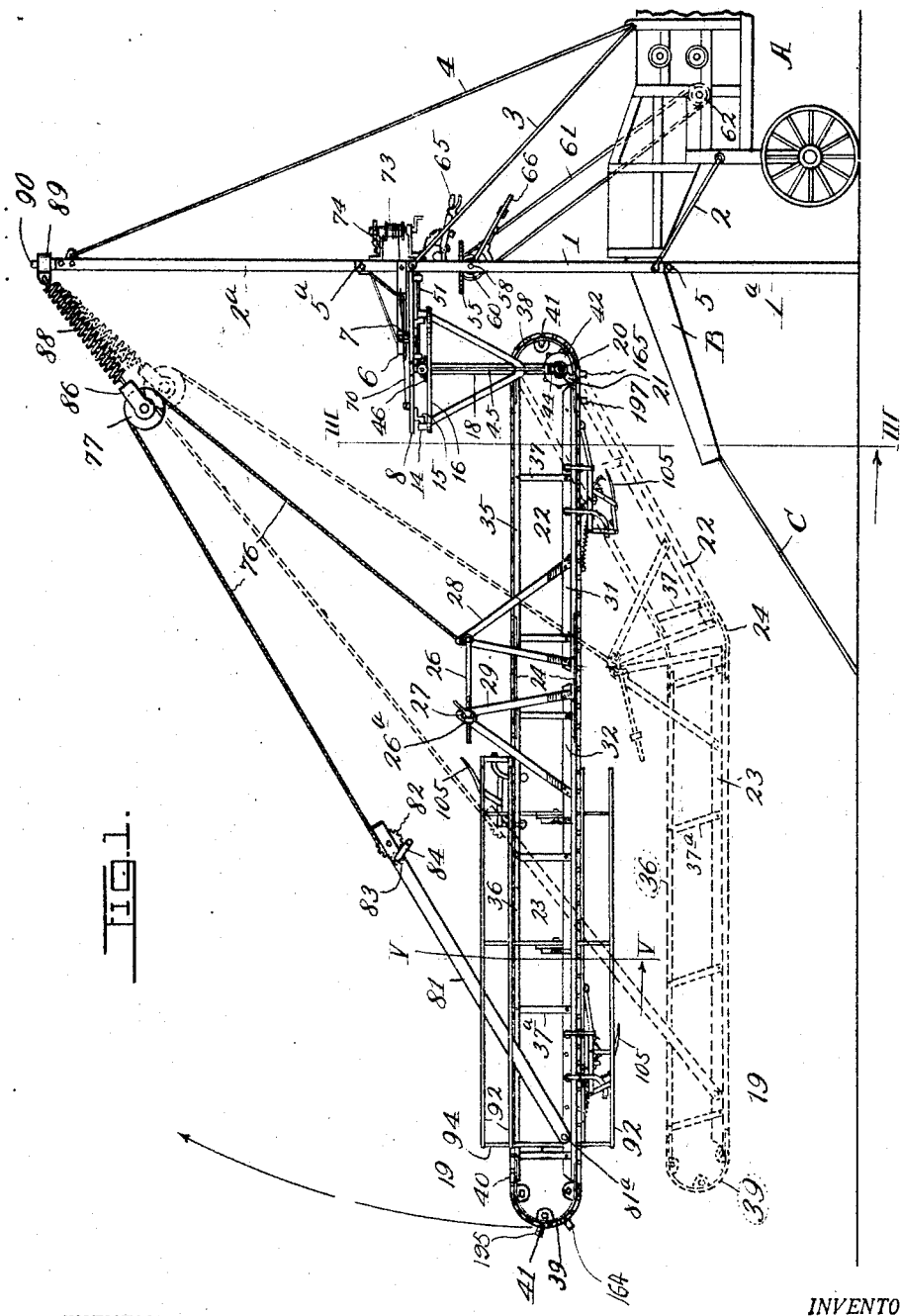

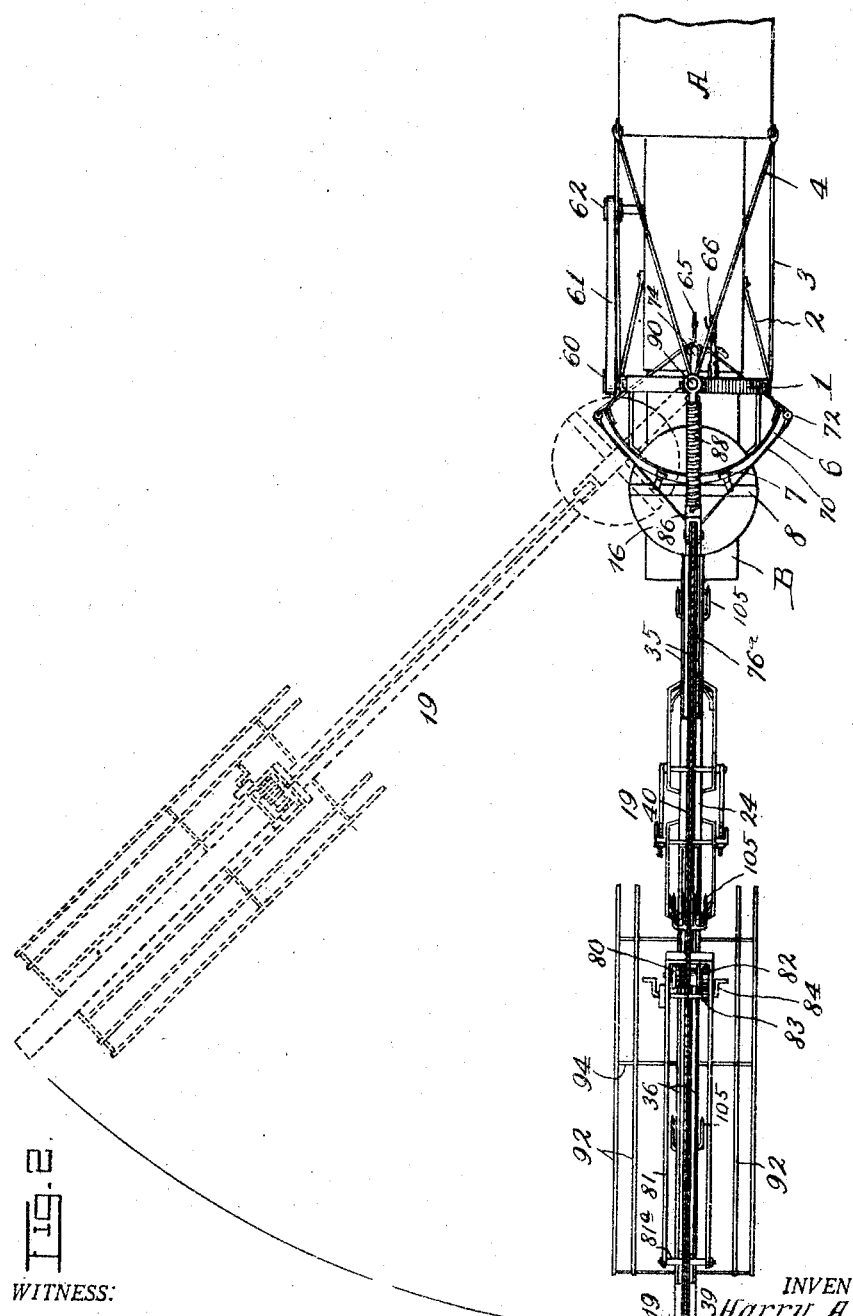

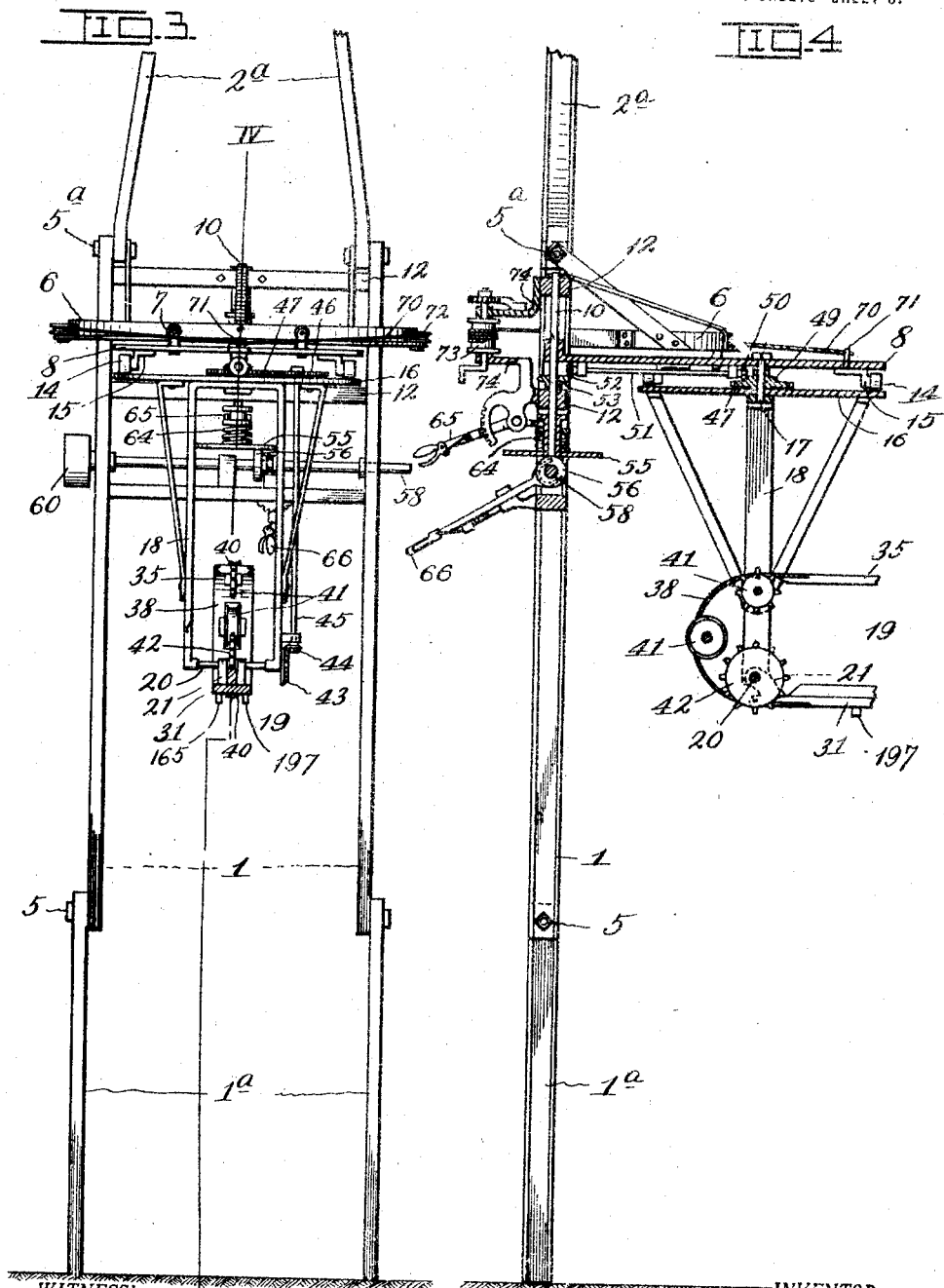

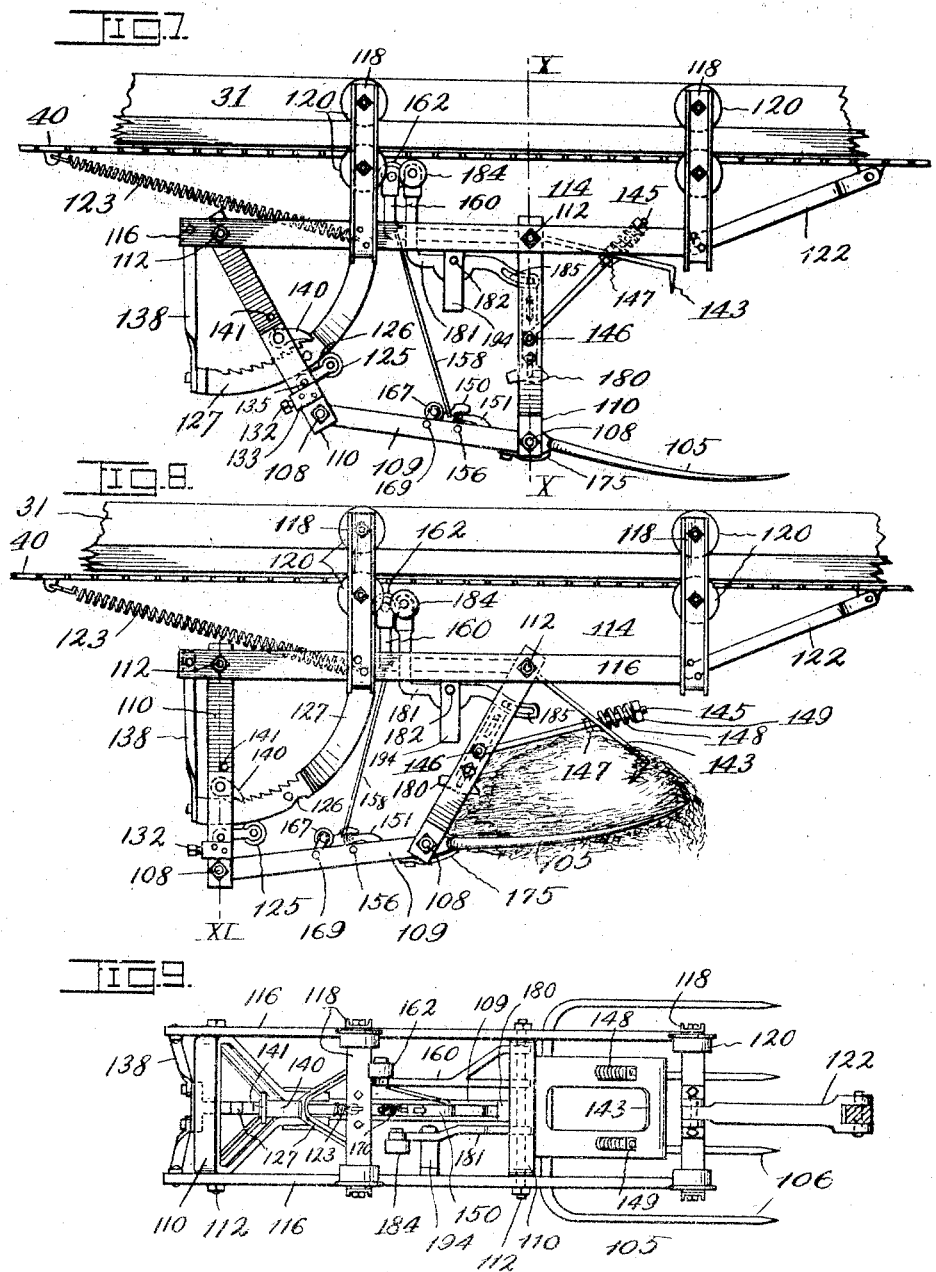

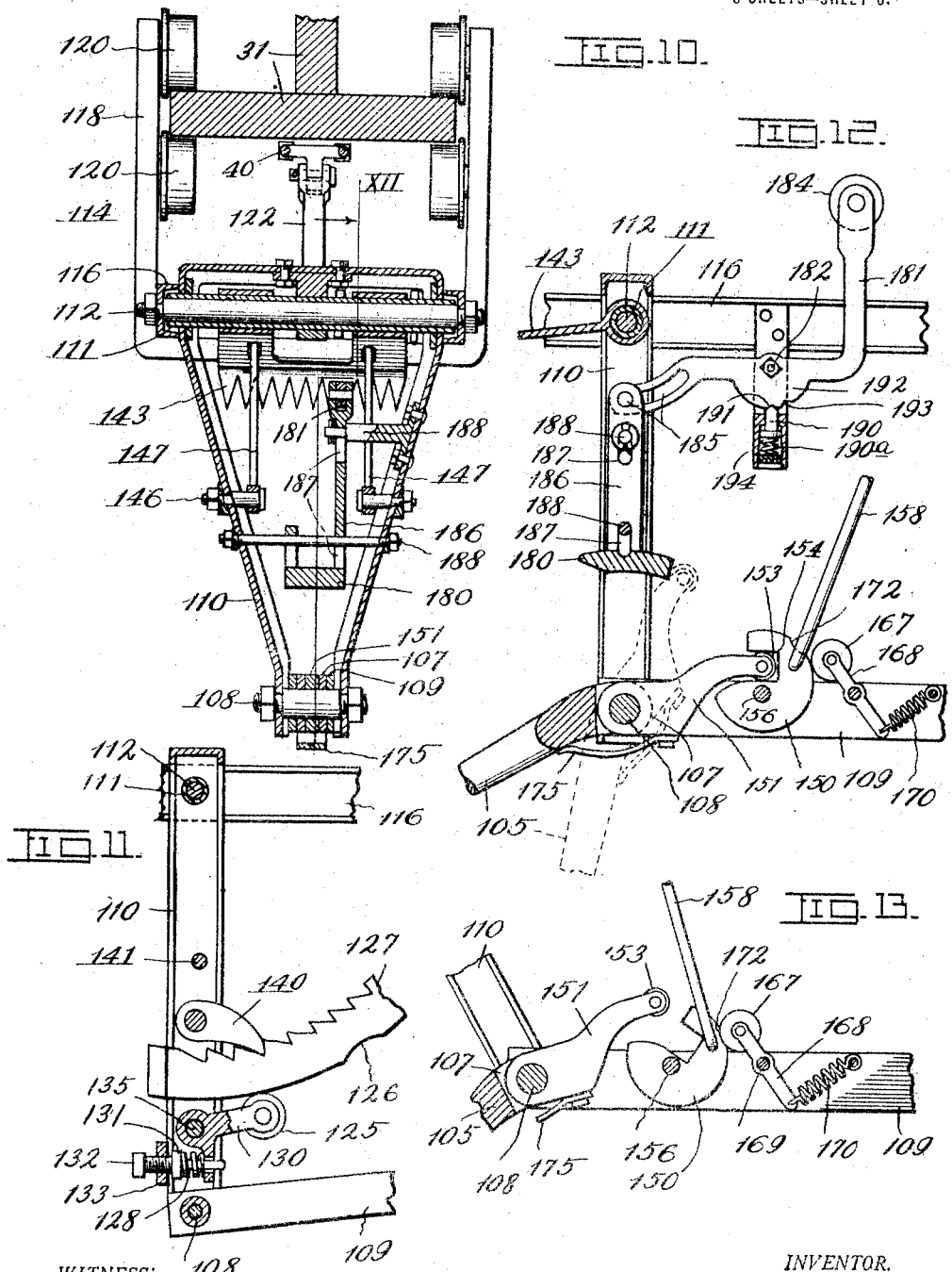

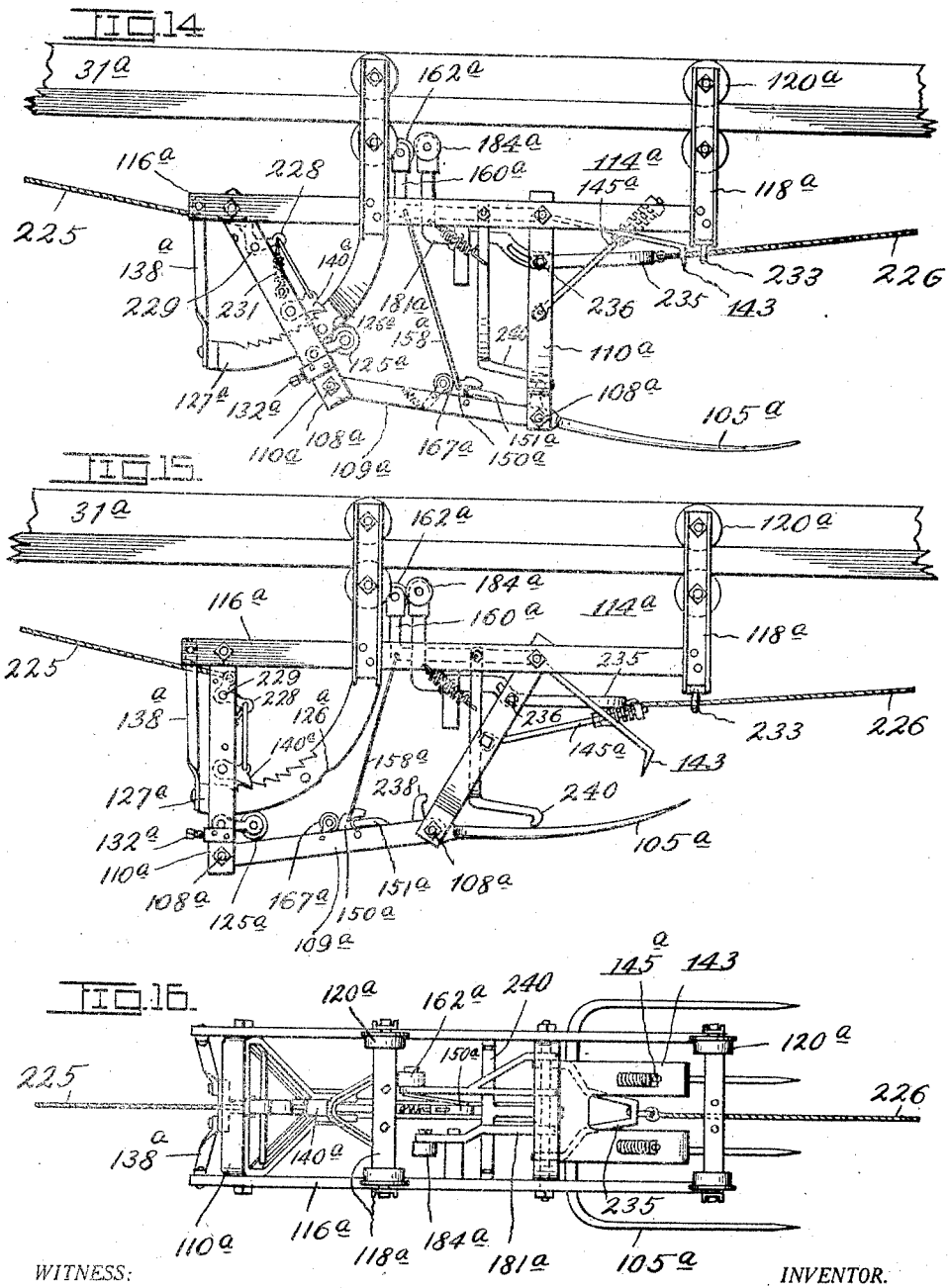

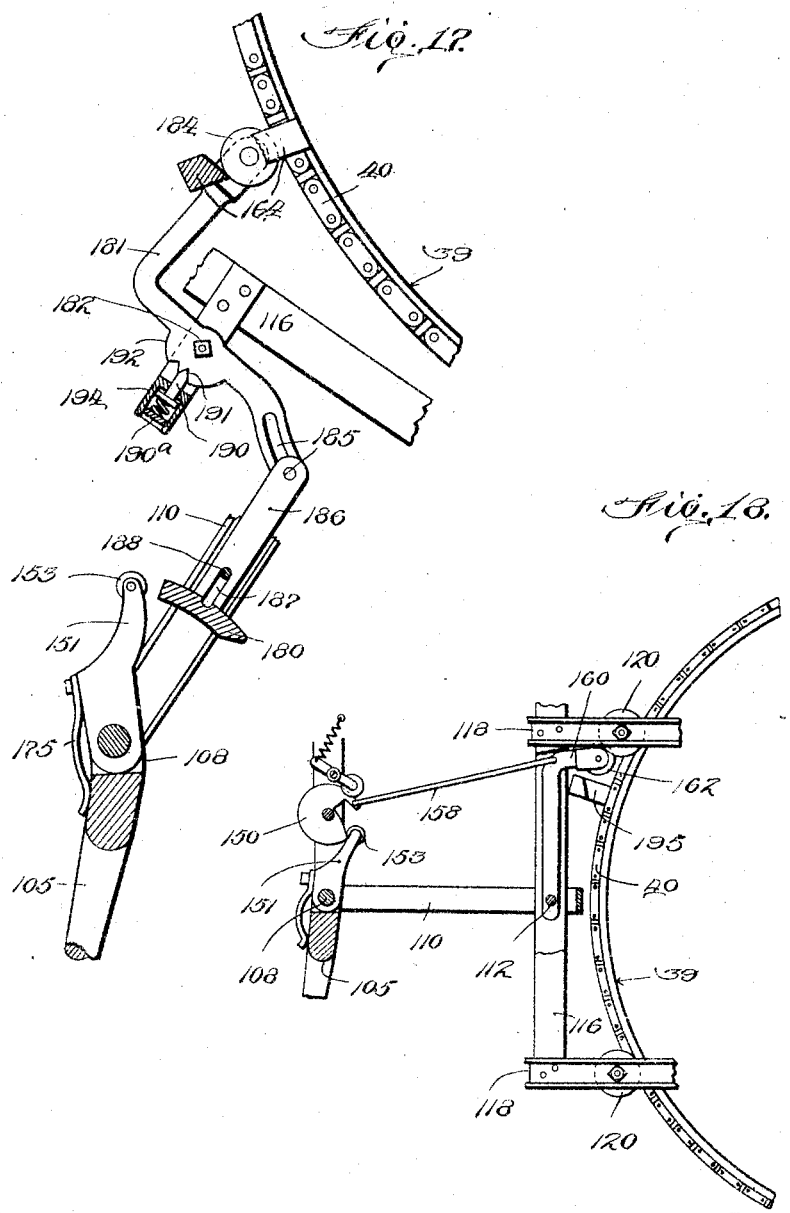

UNITED STATES PATENT OFFICE.

HARRY A. BEAN, OF NESS CITY, KANSAS.

AUTO-FORK.

1,366,156.  Specification of Letters Patent.  Patented Jan. 18, 1921.

Application filed May 14, 1918. Serial No. 234,369.

*To all whom it may concern:*

Be it known that I, HARRY A. BEAN, a citizen of the United States, residing at Ness City, in the county of Ness and State of Kansas, have invented certain new and useful Improvements in Auto-Forks, of which the following is a specification.

My invention relates to an automatic extension feeder for threshing machines, and one object is the provision of means for automatically taking grain from a stack and delivering it to a threshing machine.

With the above and other objects in view which will hereinafter appear, the invention may be said to embody a boom movable vertically and laterally and provided with an endless carrier embodying one or more forks for taking grain from the stack and conducting it to the threshing machine.

The apparatus is capable of conducting grain from a stack to a threshing machine in, substantially, a uniform manner as rapidly as said threshing machine can handle the grain, and is so arranged that it can be readily controlled by one operator.

In order that the invention may be fully understood, reference will now be made to the accompanying drawings, in which:

Figure 1 is a broken, side elevation of the front portion of a thresher equipped with my apparatus.

Fig. 2 is a plan view of the same with some of the parts removed.

Fig. 3 is an enlarged, broken, vertical sectional view on line III—III of Fig. 1.

Fig. 4 is an irregular vertical, sectional view on line IV—IV of Fig. 3.

Fig. 5 is an enlarged, cross sectional view of a hand rail and associated parts, on line V—V of Fig. 1.

Fig. 6 is an enlarged, irregular, sectional view on line VI—VI of Fig. 5.

Fig. 7 is a side elevation of one of the forks and associated parts in position to take grain from the top of a stack.

Fig. 8 is a side elevation of the same parts with the fork in carrying position with a charge of grain taken from the stack.

Fig. 9 is a plan view of the parts disclosed by Fig. 7.

Fig. 10 is an enlarged vertical section on line X—X of Fig. 7.

Fig. 11 is a broken, irregular section of a pawl and ratchet and associated parts, for holding the forks in the position disclosed by Fig. 8.

Fig. 12 is a broken, irregular vertical section, taken on line XII of Fig. 10, with some of the parts removed.

Fig. 13 is a broken, vertical section showing the position of certain parts disclosed by Fig. 12, after the fork has been tripped to discharge its load.

Fig. 14 is a broken, side elevation of a modified form of fork and associated parts, in position to remove grain from the stack.

Fig. 15 is a broken, side elevation of the same parts with the fork in position to carry a charge of grain to the thresher.

Fig. 16 is a plan view of the parts disclosed by Fig. 14, excepting the boom.

Fig. 17 is a detail of a latch-bar and its actuating means.

Fig. 18 is a detail of a stop and associated parts.

Referring now in detail to the different parts, A designates the threshing machine which is equipped with my apparatus and a self-feeder B, from which an inclined plane C extends to the ground to prevent grain from falling beneath said feeder B.

1 designates a pair of standards which support, approximately, all of the present mechanism and are secured to the thresher A, by braces 2, 3 and 4. Said standards have foldable lower and upper members $1^a$ and $2^a$, mounted on pivots 5 and $5^a$, respectively, so that the standards may be shortened preparatory to moving the thresher A from one place to another.

6 designates a segmental track projecting from the standards 1, at a point above the thresher A. Rollers 7 to traverse said segmental track 6 are mounted on brackets on a frame 8, pivotally-mounted upon a jack shaft 10, journaled in cross bars 12, fixed to the standards 1 (Figs. 1, 3 and 4). Rollers 14, mounted on brackets 15 depending from the frame 8, engage a turn-table 16 and keep the same from tipping on a vertical pin 17, depending from the forward portion of said frame 8. A hanger 18 depending from the turntable 16, carries a boom 19 which is operably-connected to the lower portion of said hanger by a shaft 20 and brackets 21.

The boom 19 embodies two main sections 22 and 23, connected by flexible joints 24, so that said boom may be adjusted either to the full or dotted line positions disclosed by Fig. 1. The boom 19 is held in the extended full line position disclosed by Fig. 1, by a threaded rod 26, a nut $26^a$, and a clamp 27, which latter is connected to brackets 28 and 29, extending upwardly from the lower beams 31 and 32, of the boom sections 22 and 23, respectively. The boom sections 22 and 23 also embody upper beams 35 and 36, operably-connected to the lower beams 31 and 32 by parallel members 37 and 37ª, respectively. The rear end of the beam 35 is connected by a curved spring 38 to the rear end of the beam 31, while the forward end of the beam 36 is connected by a curved spring 39 to the forward end of the beam 32. By employing the springs 38 and 39, the beams 35 and 36 may approach the beams 31 and 32, respectively, when the boom is lowered to the dotted line position, Fig. 1, and thus maintain the same distance around the boom as when the same is in the full line position. This resilient feature permits an endless conveyer or sprocket chain 40 to travel around the boom without binding while said boom is in any of its various positions.

Said conveyer 40 travels on idlers 41, mounted on the boom, and is driven by a sprocket wheel 42, fixedly-mounted upon the shaft 20, which is driven by a train of gearing (Figs. 1, 3 and 4), consisting of a bevel wheel 43 fixed upon one end of the shaft 20, a small bevel wheel 44 intermeshing with the bevel wheel 43 and mounted upon the lower end of a vertical shaft 45, a cog wheel 46 fixedly-mounted upon the upper end of said vertical shaft 45, a cog wheel 47 intermeshing with the cog wheel 46 and loosely mounted upon the pin 17, a bevel gear 49 integral with the cog wheel 47, a bevel wheel 50 intermeshing with the bevel wheel 49 and mounted upon one end of a horizontal shaft 51, a bevel wheel 52 mounted upon the opposite end of the shaft 51, a bevel wheel 53 fixed upon the shaft 10 and intermeshing with the bevel gear 52, a large friction disk 55 slidably mounted upon the shaft 10 but caused to rotate therewith with well-known means as a feather and a small friction wheel 56 bearing against the friction wheel 55 and slidable upon a shaft 58, journaled in the standards 1 and provided at one end with a pulley 60, driven by a belt 61 from a pulley 62 on the thresher. The friction wheel 55 is yieldably-held in engagement with the friction wheel 56, by a spring 64 which is kept under the desired tension by a hand lever 65. The speed of the friction wheel 55 and the conveyer 40 is regulated by shifting the friction wheel 56 toward or away from the shaft 10, such shifting being accomplished by a hand lever 66. The foregoing construction permits the boom to be swung laterally to either side on the pin 17, or the shaft 10 without interfering with the operation of the conveyer 40.

When it is desired to swing the boom laterally to either side for a considerable distance (see dotted lines Fig. 2) it is swung with the frame 8 from the shaft 10. The latter operation is performed through the intermediacy of a cable 70, attached at its central portion to an eye 71 on the forward portion of the frame 8. Said cable 70 extends in opposite directions from the eye 71, over guide rollers 72 to a windlass 73 mounted in brackets 74 secured to the cross bars 12. After the frame 8 has been swung laterally with the boom 19, said frame may be secured from further movement by a toothed wheel 75, fixed to the windlass 73, and a detent 76 secured to the uppermost bracket 74.

The forward end of the boom 19 is adjustably supported by a cable 76ª, running around a sheave 77 and attached at one end to the bracket 28 and at its opposite end to a drum 80, mounted in a yoke 81 secured at its forward lower ends to a transverse bar 81ª, fixed to the beam 32. The drum 80 is rotated by a cog wheel 82, driven by a pinion 83 mounted on a crank shaft 84, which may be rotated in one direction to lower the forward end of the boom, or rotated in an opposite direction to raise said forward end. The sheave 77 is journaled in a yoke 86, yieldably-connected by a retractile spring 88 to a collar 89, swiveled on a stud 90 at the upper ends of the standards 1. The spring 88 acts in the nature of a counterbalance to the boom, so that it may be raised and lowered to a limited degree by hand without operating the drum 80.

For convenience of the operator in swinging the boom 19, laterally, or up and down, I provide two pairs of hand rails 92 (Figs. 1 and 5) paralleling the boom and carried by a frame 94, mounted on pivots 95 carried by brackets 96 extending upwardly from the beam 32, so that said frame 94 may be adjusted to the full and dotted line positions, respectively, disclosed by Fig. 5. When in use the operator grasps the adjacent uppermost hand rail 92 while one of the lowermost hand rails may rest upon the stack. After being adjusted to the full or dotted line positions the frame 94 is secured to a segment 100 on one of the brackets 96, by a pair of clamps 101.

Any suitable number of forks for carrying the grain from the stack to the feeder B of the thresher A may be employed. In Fig. 1, of the drawings I have shown three forks connected equal distances apart to the conveyer 40 to travel therewith around the boom 19. The construction of the forks and their controlling mechanism is alike, and more clearly shown in Figs. 7 to 13, inclusive.

Each fork 105 consists of a plurality of tines 106 united at their rear ends and provided with a lug 107, mounted on a pivot 108 uniting the lower ends of a forward hanger 110. A pair of connecting bars 109 spaced slightly apart are operably connected to the forward hanger 110 and a companion hanger 110, through the intermediacy of the pivots 108. The connecting-bars 109 are of such length as to cause the hangers 110 to converge toward their ends and hold said connecting bars in inclined position, so that they in turn will coact in holding the fork 105 in the inclined positions disclosed by Figs. 7 and 8. The hangers are provided at their upper portions with sleeves 111, loosely mounted on bolts 112 connected to opposite sides of the fork carriage 114. Said carriage embodies a pair of parallel longitudinal bars 116 and a pair of U-members 118 uniting the bars 116 and provided at each upper end with a pair of rollers 120, which traverse the boom 19. The carriage 114 is operably-connected at its forward portion to the conveyer 40 by a draw-bar 122 and yieldably-connected at its rear portion to said conveyer 40 by a spring 123, which latter restrains the carriage from running faster than the conveyer 40 as said carriage passes downward around the forward end of the boom 19.

As the fork approaches the top of the stack, it is held in the slightly inclined position disclosed on Fig. 7, by a roller detent 125 which is yieldably held in a recess 126 on a segmental ratchet bar 127, by a coil spring 128 (Fig. 11), bearing at one end against a yoke 130, carrying the roller 125, and a shoulder 131 on a tension screw 132, threaded in a bar 133 secured to the lower portion of the rear hanger 110, to which the yoke 130 is also operably-connected by a pivot 135.

The segmental ratchet bar 127 is secured at its upper forked end to the rearmost U-member 118 and at its lower end to a pair of bars 138, depending from the rear ends of the carriage bars 116. The lower T-shaped end of the ratchet bar 127 projects into the path of the rearmost hanger 110 and limits the backward movement thereof. A pawl 140, pivotally connected to the rearmost hanger 110 coacts with the ratchet bar 127 in holding said rearmost hanger 110 in vertical position, so that it in turn will hold the fork in the slightly upturned position disclosed by Fig. 8, after said fork has taken a charge of grain from the stack. A pin 141 connected to the rearmost hanger 110 limits the downward movement of the pawl 140, as it falls out of engagement with the ratchet bar 127 when the carriage passes upwardly around the rear end of the boom and assumes the inverted position disclosed by Fig. 1.

A retainer 143 coacts with the fork 105 in holding the charge of grain on said fork. Said retainer 143 is swiveled at its upper end upon the foremost sleeve 111 and is controlled by a pair of rods 145 extending through said retainer and pivotally-mounted at their lower ends on bolts 146 secured to the foremost hanger 110. Nuts 147 threaded upon the rods 145, prevent the retainer 143 from moving down independently of said rods 145, but coil springs 148 interposed between the retainer 143 and nuts 149 on the outer ends of the rods 145, permit said retainer to yield upwardly to a slight degree to accommodate itself to the charges of grain picked up by the fork each time it passes over the stack.

As the fork 105, with a charge of grain, passes over the thresher feeder B, said fork is automatically tripped and swings down to deposit its charge upon said feeder. Tripping of the fork is accomplished by a cam 150 and an arm 151, which latter is pivotally-mounted upon the forward pivot 108. Said arm 151 is provided at its rear end with a roller 153, adapted to enter a recess 154 in the cam 150 and thus hold the fork 105 in the positions disclosed by Figs. 7, 8 and 12. The cam 150 is mounted between the connecting bars 109 on a pivot 156 and is actuated by a link 158, which extends upwardly to a trip lever 160, pivotally-mounted at its forward forked end upon the forward sleeve 111. The upwardly-extending rear end of the trip lever 160, is provided with an antifriction roller 162, which successively contacts blocks 195 and 197 at the front and rear ends, respectively, of the boom 19 (Fig. 1). In the travel of the fork 105 around the front end of the boom 19, the arm 151 swings against the cam 150, Fig. 18, which is then rotated to engage and hold the roller 153 when the roller 162 contacts the block 195. The fork 105 is then held in position to take grain from the stack to the thresher feeder B, upon which said grain is deposited when the roller 162 is depressed by the block 197. The roller 162 is held in its raised and lowered positions by the pressure of the detent roller 167 against the cam 150.

When the roller 162 is depressed by the block 197 it forces the link 158 downwardly, which in turn rotates the cam 150 to the position disclosed by Fig. 13, thereby releasing the roller 153 and permitting the fork to swing downwardly and deposit its charge of grain upon the feeder B. The cam 150 is retained in the position disclosed by Fig. 13, by a roller detent 167 mounted on a lever 168, fulcrumed at 169 and connected at its lower end to a coil spring 170, whereby said detent 167 is yieldably-held in a recess 172 in the periphery of the cam 150. One end of the spring 170 and the fulcrum 169 are secured to the carriage connecting bars 109.

A bow spring 175, secured to the arm 151 yieldably-holds the fork 105 in proper relation to said arm 151, but allows the fork to spring backwardly slightly should it strike an obstruction while scraping up grain from the ground. When cleaning up grain from the ground the arm 151 is prevented from swinging forwardly too far and allowing the fork to drag loosely over the ground by a stop 180, which is automatically lowered into the path of the roller 153 (Fig. 12), by a latch bar 181 mounted on a pivot 182 and provided at its upper rear end with an anti-friction roller 184. The forward end of the latch bar 181 has a pin-and-slot connection 185 with the upper end of an arm 186, carrying at its lower end the stop 180 and provided with slots 187 through which guides 188, fixed to the forward hanger 110, extend.

The roller end of the latch bar 181 is yieldably-held in the raised position disclosed by Fig. 12, through the intermediacy of a spring detent 190 entering a notch 191 in the segmental portion 192 of said trigger. Said detent 190 also holds the roller end of the latch bar 181 in lowered position by entering a notch 193 in the segment 192. An arm 194 depending from one of the carriage bars 116, supports the detent 190 and its actuating spring 190ª.

When the rear end of the latch bar 181 is held in lowered position, as just described, it holds the stop 180 in raised position, so that the roller 153 may pass thereunder and allow the fork 105 to swing backward to the position disclosed by the uppermost fork on Fig. 1, as the carriage passes upward on top of the boom 19.

When cleaning up grain from the ground the block 195 is removed to allow the fork 105 to hang down and scrape the ground, and a block 164 is placed in position at the forward end of the boom in the path of the roller 184, so the same will strike and pass over said block 164 and cause the latch bar 181 to lower the stop 180 into the path of the roller 153, to prevent the arm 151 from swinging backward beyond the dotted position Fig. 12. After the fork has traveled substantially the length of the boom and discharged the grain on the feeder B, the roller 184 is depressed by a block 165 placed in position at the rear underside of the boom, Fig. 1. By thus depressing the roller end of the latch bar 181, the stop 180 is raised out of the path of the roller 153 to permit the fork to swing backward to the position disclosed by the uppermost fork on Fig. 1. If desired the block 197 may be removed with the block 195, as neither is required when scraping grain from the ground.

The operation briefly stated is as follows: The boom 19 is adjusted to the proper height above the top of the stack through the intermediacy of the cable 76 and the drum 80, which latter is actuated by the operator who stands upon the stack. The blocks 195 and 197 are placed in position and the thresher A is then started up and through the intermediacy of the gearing drives the conveyer 40 continuously until the thresher is stopped. As the conveyer 40 travels around the boom it carries the forks 105 therewith. Each fork enters the stack with the tines 106 slightly depressed, as disclosed by Fig. 7. As a fork enters the top of the stack the pressure of the grain against said fork and the forward hanger 110, overcomes the resistance offered by the roller detent 125 in its recess 126 and forces the fork and the hanger 110 backwardly to the position disclosed by Fig. 8, in which position they are retained by the pawl 140 and the ratchet bar 127. As the forward hanger 110 swings backward, it, through the intermediacy of the rods 145, pulls the retainer 143 down upon the charge of grain and prevents it from being blown off by the wind before being discharged upon the feeder B. Discharging of the grain upon the feeder B is automatically accomplished by the block 197 tripping the roller 162, which, through the intermediacy of the intervening mechanism, rotates the cam 150 out of engagement with the roller 153 (Fig. 13), and permits the fork 105 to swing down to deliver the grain. When the stack has been reduced sufficiently to permit the grain to be scraped from the ground the blocks 195 and 197 are removed and the blocks 164 and 165 are placed in position, so that when the roller 184 passes over the block 164 the stop 180 will be lowered into the path of the roller 153 and hold the fork 105 in the dotted line position, Fig. 12. After the fork has scraped a charge of grain from the ground and discharged it upon the feeder B, the stop 180 is raised out of the path of the roller 153, so that the same may swing forward when the fork 105 swings backward to the position disclosed by Fig. 1, as it passes from the underside to the upper side of the boom 19. Tripping of the stop 180 is automatically accomplished by the roller 184 and the intervening mechanism when said roller 184 is depressed by the block 165.

While the apparatus is reducing the stack to the ground the top of said stack is maintained in substantially a level state by swinging the boom slowly from one side of the stack to the other, which is readily accomplished by the operator, through the intermediacy of the handles 92. During such swinging of the boom 19 from side to side, it turns on the pin 17, but if considerable lateral movement is desired the drum 73 is actuated, so that the boom may turn upon the axis provided by the shaft 10. As the height of the stack is reduced the boom is gradually lowered by loosening the clamp 27 from the rod 26 at intervals and paying out the cable 76 as required.

With the apparatus constructed and operated as above described, one operator can quickly and efficiently feed a large stack of grain to the thresher A, in substantially, a uniform manner, so that said thresher will not run idle at intervals and be chocked with grain at other times.

Preparatory to moving the thresher from place to place the members 1ª and 2ª are folded and the boom is swung around beside the thresher, so that the same can pass through gates, beneath telephone wires, etc.

While I have shown the feeder attached to a thresher, it is to be understood that it is also applicable to hay balers, loaders and other implements to which hay or grain is to be fed.

The modified form of fork disclosed by Figs. 14 to 16, inclusive, is similar in a great many respects to the preferred form as indicated by corresponding reference numerals with exponents, hence it is not deemed necessary to go into details, except with reference to the new features. This type of fork is not intended to travel in cycles about the boom as in the preferred form, but is drawn back and forth by cables 225 and 226, respectively, which may be actuated by any suitable means (not shown). The cable 225 is attached to a bell-crank 228, pivotally connected by a pin 229 to the rearmost hanger 110ª. Said bell-crank 228 is operably-connected to a pawl 140ª, which coacts with the rack 127ª toward which it is drawn by a spring 231. The cable 226 extends through an eye 233 depending from the foremost U-member 118ª. Said cable 226 is connected to a bail 235, connected by pivots 236 to opposite sides of the foremost hanger 110ª. The rear end of the fork 105ª has an upwardly extending lug 238 for engagement with a hook 240, connected at its upper forked ends to the side bars 116ª of the carriage 114ª. After the fork 105 has been tripped to deposit its load upon the thresher feeder, the carriage is drawn backwardly with said fork in a depending position until the same strikes the stack and is swung upward thereby to the position disclosed by Fig. 14. As the fork 105 swings upwardly its lug 238 engages the hook 240, which supports the fork as it continues its backward movement. Before the fork 105 reaches the end of its backward movement the cam 150ª is rocked into engagement with the roller on the fork arm 151ª and holds the fork in raised position after it moves forward into the stack and the lug 238 is disengaged from the hook 240, as shown on Fig. 15. The cam 150ª continues to support the fork in raised position until tripped at the thresher feeder.

Having thus described my invention, what I claim and desire to secure by Letters Patent, is:

1. In a machine of the character described, a boom mounted to swing vertically and laterally and consisting of upper longitudinal members, flexible means connecting the adjacent ends of said members, lower longitudinal members spaced beneath the upper members, flexible means connecting the adjacent ends of said lower members, flexible curved means connecting the extreme ends of the upper and lower members, parallel members pivotally connected at their upper and lower ends to the upper and lower longitudinal members, respectively, and means connected to the adjacent ends of the lower longitudinal members whereby the same may be secured in rigid relation to each other.

2. In a machine of the character described, a support, a boom operably connected to said support, a drum mounted on said boom, a cable attached at one end to said drum and at its opposite end to the boom, a sheave around which said cable extends, a yoke in which said sheave is mounted, a counterbalance spring connected to said yoke and the support, an endless conveyer arranged to travel around the boom, and means on said conveyer for taking grain from a stack.

3. In a machine of the character described, a support, a swingable frame mounted on said support, a turntable operably connected to said swingable frame, a hanger depending from said turntable, a boom operably connected to said hanger, and a fork arranged to traverse said boom.

4. In a machine of the character described, a support, a swingable frame mounted on said support, a turntable operably connected to said swingable frame, a hanger depending from said turntable, a boom connected to said hanger, an endless conveyer to traverse said boom, a train of gearing extending from the support to the boom to drive the conveyer, and a fork actuated by said conveyer and mounted on the boom.

5. In a machine of the character described, a boom, a carriage to traverse said boom, a fork swingably connected to said carriage, an arm yieldably connected to the rear end of the fork, a roller on the free end of said arm, a cam for engaging said roller to hold the arm and the fork in position to carry a load, and means for disengaging said cam from the roller to allow the fork to discharge the load.

6. In a machine of the character described, a carriage, a fork operably mounted on said carriage and adapted to swing down to, approximately, a vertical position, a stop on the carriage engaged by the fork when the same swings downwardly, and means for adjusting said stop in and out of the path of the fork.

7. In a machine of the character described, a carriage, a fork operably mounted on said carriage and adapted to swing down to, approximately, a vertical position, a stop on the carriage engaged by the fork when the same swings downwardly, and a latch-bar on the carriage for moving said stop in and out of the path of the fork.

8. In a machine of the character described, a carriage, a fork operably mounted on said carriage and adapted to swing down to, approximately, a vertical position, a stop on the carriage engaged by the fork when the same swings downwardly, a latch-bar on the carriage for moving said stop in and out of the path of the fork, and a detent to prevent accidental movement of said latch-bar.

9. In a machine of the character described, a carriage, a fork operably mounted on said carriage and adapted to swing down to, approximately, a vertical position, a stop on the carriage engaged by the fork when the same swings downwardly, a latch-bar on the carriage for moving said stop in and out of the path of the fork, a boom traversed by the carriage, and means on said boom for actuating said latch bar.

10. In a machine of the character described, a carriage, a fork operably mounted on said carriage and adapted to swing down to, approximately, a vertical position, a stop on the carriage engaged by the fork when the same swings downwardly, a latch-bar on the carriage for moving said stop in and out of the path of the fork, a boom traversed by the carriage, means on said boom to cause the latch-bar to move the stop into the path of the fork, and means on the boom to cause the latch-bar to move the stop out of the path of the fork.

11. In a machine of the character described, a carriage, a fork operably mounted on said carriage and adapted to swing down to, approximately, a vertical position, an arm yieldably connected to said fork, and a stop on the carriage engaged by said arm when the fork swings downwardly.

12. In a machine of the character described, a boom, a carriage to traverse said boom, a fork operably connected to said carriage, means for holding said fork in position to receive and carry a load, a retainer on the carriage to coact with the fork in holding the load thereon, and means connected to the carriage and said retainer to automatically swing the same into engagement with the load when the fork is in carrying position and away from the load when the fork dumps.

13. In a machine of the character described, a carriage, hangers pivotally connected to said carriage, means connected to the lower ends of said hangers to cause them to operate in unison, a fork operably connected to the foremost hanger, and a pawl and ratchet means to prevent the hangers from swinging forwardly when the fork is loaded.

14. In a machine of the character described, a carriage, hangers pivotally connected to said carriage, means connected to the lower ends of said hangers to cause them to operate in unison, a fork operably connected to the foremost hanger, a detent connected to one of said hangers, and a segmental member depending from the carriage and provided with a recess to receive said detent and prevent the hangers from swinging backwardly when the fork is in position to take a load.

15. In a machine of the character described, a carriage, hangers pivotally connected to said carriage, connecting bars pivotally secured to the lower ends of said hangers, a fork operably connected to the foremost hanger, a retainer operably connected to the carriage to coact with the fork in holding a load, and members operably connected to the foremost hanger and said retainer to move the same toward and away from the fork.

16. In a machine of the character described, a carriage, hangers pivotally connected to said carriage, connecting bars pivoted to the lower ends of said hangers and of such length as to cause the hangers to converge toward their lower ends, a fork operably connected to the foremost hanger, a pawl pivoted to the rearmost hanger, and a segmental ratchet-bar depending from the carriage and engaged by said pawl to prevent the hangers from swinging forwardly when the fork is loaded.

17. In a machine of the character described, a carriage, hangers pivotally connected to said carriage, connecting bars pivoted to the lower ends of said hangers and of such length as to cause the hangers to converge toward their lower ends, a fork operably connected to the foremost hanger, a pawl pivoted to the rearmost hanger, a segmental ratchet-bar depending from the carriage and engaged by said pawl to prevent the hangers from swinging forwardly when the fork is loaded, means operably mounted on the connecting bars to support the fork in position to take on and carry a load, and means to automatically disengage the aforesaid means so that the fork may discharge the load.

18. In a machine of the character described, a boom, an endless conveyer to traverse said boom, a carriage to traverse said boom, a draw-bar connecting the forward portion of said carriage to the conveyer, resilient means connecting the rear portion of the carriage to the conveyer, and a fork operably connected to the carriage.

19. In a machine of the character described, a boom, a carriage to traverse said boom, a fork swingably connected to said carriage, a cam rockably-mounted on the carriage to hold the fork in position to carry a load, a trip lever connected to said cam to disengage it from the fork, means on the boom for actuating said trip lever, and means on the carriage to hold the cam in position for engagement with the fork when the same is restored to carrying position.

20. In a machine of the character described, a carriage, hangers pivotally connected to said carriage, connecting-bars pivotally secured to the lower ends of said hangers, a fork operably associated with said connecting-bars, a retainer on the carriage to coact with the fork in holding a load thereon, and means pivotally connected to one pair of hangers and yieldably connected to said retainer to swing the same into engagement with the load when the fork is in carrying position and away from the load when the fork dumps.

In testimony whereof I affix my signature, in the presence of two witnesses.

HARRY A. BEAN.

Witnesses:
FRED C. FISCHER,
L. J. FISCHER.